United States Patent [19]

Steigerwald

[11] Patent Number: 5,594,629
[45] Date of Patent: Jan. 14, 1997

[54] HIGH-FREQUENCY SWITCHING CIRCUITS OPERABLE IN A NATURAL ZERO-VOLTAGE SWITCHING MODE

[75] Inventor: Robert L. Steigerwald, Burnt Hills, N.Y.

[73] Assignee: General Electric Company, Schenectady, N.Y.

[21] Appl. No.: 603,405

[22] Filed: Feb. 20, 1996

Related U.S. Application Data

[63] Continuation of Ser. No. 262,177, Jun. 20, 1994, abandoned.

[51] Int. Cl.[6] .................................................. H02M 3/335
[52] U.S. Cl. ............................................. 363/21; 363/131
[58] Field of Search .................................. 363/17, 21, 80, 363/97, 131; 323/222, 271, 282

[56] References Cited

U.S. PATENT DOCUMENTS

| | | | |
|---|---|---|---|
| 4,189,764 | 2/1980 | Snyder | 363/21 |
| 4,672,303 | 6/1987 | Newton | 323/285 |
| 4,783,695 | 11/1988 | Eichelberger et al. | 357/65 |
| 4,864,479 | 9/1989 | Steigerwald et al. | 363/17 |
| 4,866,587 | 9/1989 | Wadlington | 363/16 |
| 4,870,555 | 9/1989 | White | 363/21 |
| 4,912,622 | 3/1990 | Steigerwald et al. | 363/98 |
| 5,057,986 | 10/1991 | Henze et al. | 363/20 |
| 5,177,675 | 1/1993 | Archer | 363/25 |

OTHER PUBLICATIONS

Zero voltage switching in high frequency power converters using pulse width modulation, Henze et al. Third Annual IEEE Applied Power Electronics Conference and Exposition, Feb. 1988 pp. 33–40.

"Magnetic and Electromagnetic Circuit Components Having Embedded Magnetic Material in a High Density Interconnect Structure," W A Roshen et al., Ser. No. 08/043,166, (GE Docket No. RD–22,506), filed Apr. 1, 1993.

"Design of the Zero–Voltage–Switching Quasi–Square–Wave Resonant Switch," Dragan Maksimovic, 1993 IEEE Power Electronics Specialists Conference, pp. 323–329.

Primary Examiner—Peter S. Wong
Assistant Examiner—Adolf Berhane
Attorney, Agent, or Firm—Jill M. Breedlove; Marvin Snyder

[57] ABSTRACT

A dc-to-dc power converter, comprising a transformer, a single primary-side power switching device and a parallel combination of a diode and a capacitance, is controlled to operate in a "natural" zero-voltage switching mode such that the power switching device is switched with zero-voltage thereacross. Due to the simplicity of the circuit, i.e., very few components, and its high-frequency capability, it can be implemented using high-density packaging techniques. Such a converter is useful in ultra-high-density point-of-load dc-to-dc converters for distributed power systems.

11 Claims, 6 Drawing Sheets

HIGH-FREQUENCY SWITCHING CIRCUITS OPERABLE IN A NATURAL ZERO-VOLTAGE SWITCHING MODE

This application is a continuation of application Ser. No.08/262,177 filed Jun. 20, 1994 now abandoned.

FIELD OF THE INVENTION

The present invention relates generally to power converters and, more particularly, to dc-to-dc power converters amenable to high-density packaging techniques and very high frequency operation, which converters have zero-voltage switching capability with minimal circuit components.

BACKGROUND OF THE INVENTION

Transition resonance for bridge-type converters has been described in U.S. Pat. Nos. 4,864,479 and 4,912,622 of R. L. Steigerwald and K.D.T. Ngo, assigned to the present assignee and incorporated by reference herein. Such circuits typically use four power switches (FET's) for high power applications, e.g., 200 Watts and greater. Although there is only one power processing magnetic component, i.e., transformer or inductor, it is impractical to use these circuits with four switches and associated gate drivers for lower power (less than 50 Watts) applications due to the relatively high costs associated therewith. Quasi-resonant and multi-resonant circuits are usually used for lower power conversion at high frequencies with a single power FET. However, although such resonant circuits have only one power FET, they typically have several resonant components (resonant inductors and capacitors) that cause inefficiencies and higher voltage or current stresses on the FET.

Accordingly, it is desirable to provide a dc-to-dc power converter that is amenable to high-density packaging techniques and very high frequency operation (e.g., 1–10MHz). It is further desirable to require only a single main power switch, rather than multiple power switching devices. Still further, it is desirable to achieve zero-voltage switching (i.e., switching with zero-voltage across a switching device) without the need for additional resonant circuit components.

SUMMARY OF THE INVENTION

A dc-to-dc power converter, comprising a transformer, a single primary-side power switching device and a parallel combination of a diode and a capacitance, is controlled to operate in a "natural" zero-voltage switching mode such that the power switching device is switched with zero-voltage thereacross. The converter is controlled such that the voltage across the primary-side power switching device resonates down to zero as the current through the diode resonates to zero before the primary-side power switching device is turned on. In an alternative embodiment, a dc-to-dc power converter is configured for operation in a zero-voltage switching mode at light loads and in a "natural" zero-voltage switching mode at heavier loads. Due to the simplicity of the circuit, i.e., its very few components, and its high-frequency capability, a converter according to the present invention can be implemented using high-density packaging techniques. Such a converter is useful, for example, in ultra-high -density point-of-load dc-to-d.c converters for distributed power systems.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
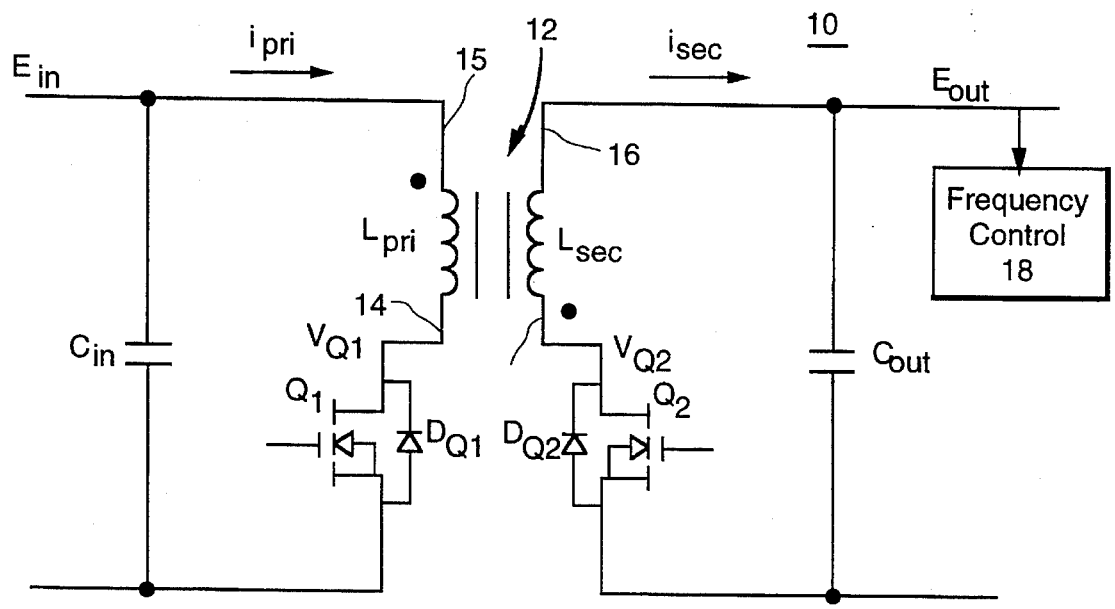
FIG. 1 schematically illustrates a high-frequency resonant flyback switching cell.
Figure 2:
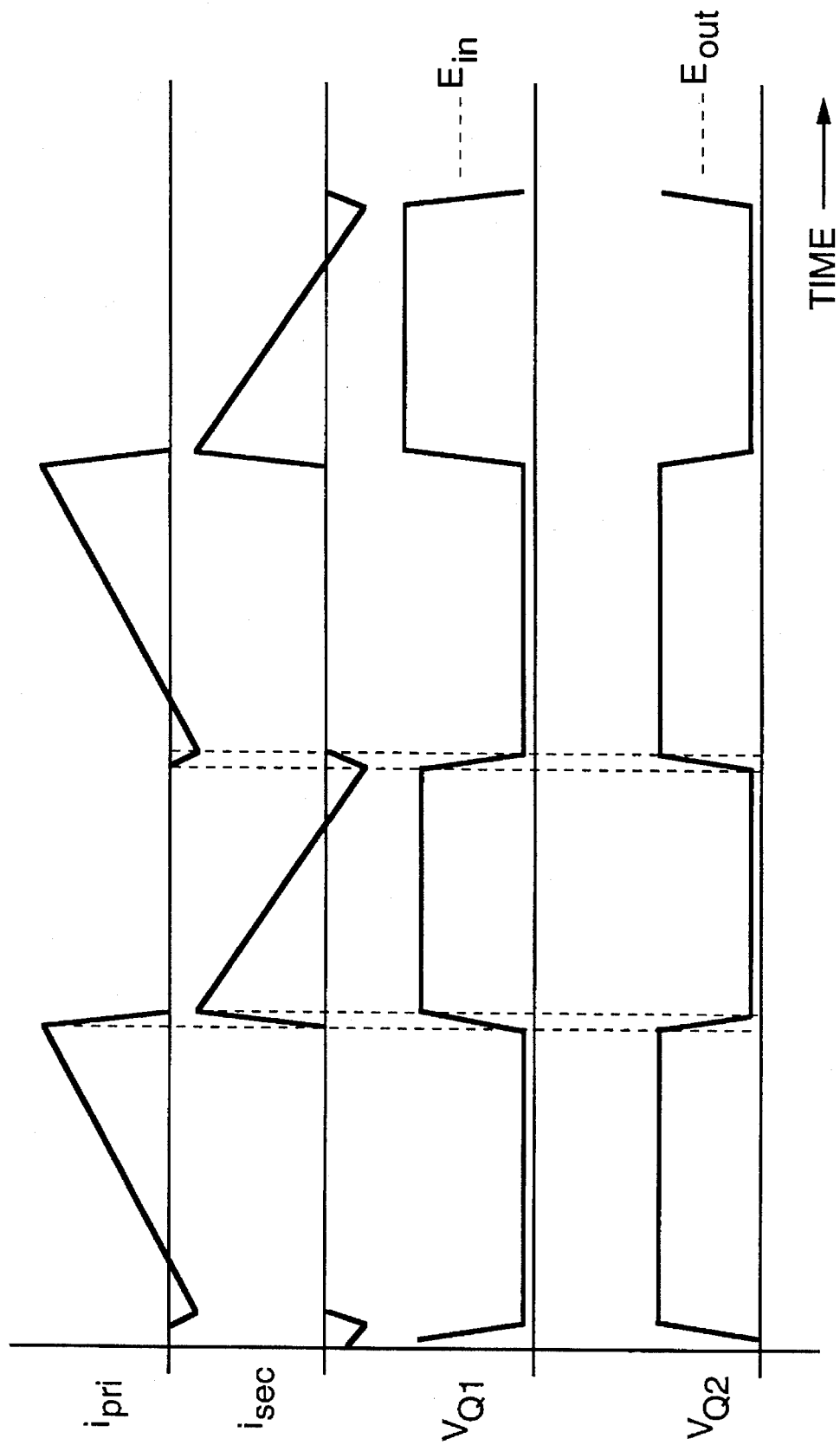
FIG. 2 graphically illustrates ideal current and voltage waveforms for the resonant flyback cell of FIG. 1.

FIG. 1 illustrates a flyback switching cell 10 comprising a transformer 12 with a primary winding inductance $L_{pri}$ and a secondary winding inductance $L_{sec}$. A primary-side power device (e.g., FET) $Q_1$ is connected in series with the primary winding $L_{pri}$ across an input dc voltage Ein and an input filter capacitor $C_{in}$. A secondary-side power switching device $Q_2$ is connected in series with the secondary winding $L_{sec}$. The integral parasitic diodes for switching devices $Q_1$ and $Q_2$, respectively, are illustrated in FIG. 1 as $D_{Q1}$ and $D_{Q2}$, respectively. The primary-side current is designated as $i_{pri}$, and the secondary-side current is designated as $i_{sec}$ in FIG. 1. The output dc voltage $E_{out}$ of the switching cell is taken across an output filter capacitor $C_{out}$. FIG. 2 graphically illustrates ideal current and voltage waveforms for operating the converter of FIG. 1 in a zero-voltage switching mode, i.e., switching the power devices $Q_1$ and $Q_2$ with zero voltage thereacross. In operation, device $Q_1$ turns on to build up current in the transformer primary magnetizing inductance (primary winding) $L_{pri}$. $Q_1$ is then switched off, interrupting the primary inductance current $i_{pri}$. The core energy is then transferred to the secondary as current increases in the secondary inductance (secondary winding) $L_{sec}$. $Q_2$ is turned on when $Q_1$ turns off so that the secondary current $i_{sec}$ flows in $Q_2$'s channel in the reverse direction. With proper selection of the secondary-side switching device $Q_2$, i.e., to provide synchronous rectification, the voltage drop across it (in the reverse direction) can be significantly less than that which would occur in a Schottky rectifier, resulting in significantly higher converter efficiency for low output voltage converters, e.g., 5 volts and less. (A synchronous rectifier is a very low on-resistance power FET.) The turns ratio of the transformer 12 is selected so that each FET $Q_1$ and $Q_2$ conducts for approximately a 50% duty cycle at the nominal input and output voltages. The output voltage $E_{out}$ is regulated by varying the duty cycle of switches $Q_1$ and $Q_2$ in conventional manner.

In the zero-voltage switching mode, energy that is stored in a FET output capacitance (measured from drain to source) when the device is off is not dissipated within the device when it is turned on, but is resonated back to the dc supply as energy stored in the primary and secondary magnetizing inductance resonates with the output capacitance of the FET to ring the voltage thereacross to zero before the gate is turned on. For example, when $Q_1$ turns off, the "undotted" terminals 14 and 16 of the transformer windings become positive. This has the effect of reducing $Q_2$'s drain voltage $V_{Q2}$ to zero before $Q_2$ turns on. After the secondary current $i_{sec}$ through $Q_2$ is driven to zero as the inductance $L_{sec}$ releases its energy, device $Q_2$ is kept on so that the current momentarily reverses in $Q_2$, i.e., flows from drain to source from the "dotted" terminal 17 of winding inductance $L_{sec}$. Then $Q_2$ is turned off, and the energy stored in the core of inductance $L_{sec}$ causes the "dotted" terminals 15 and 17 of the transformer 12 to become positive, driving $Q_1$'s drain voltage $V_{Q1}$ to zero before $Q_1$ turns on. Thus, $Q_1$ is turned on with zero voltage thereacross. In this manner, turning off one FET causes the other FET to be switched with zero voltage thereacross. And, by varying the on-time of $Q_1$, the output voltage can be regulated using a well-known constant frequency PWM control.

Disadvantageously, in the circuit of FIG. 1, there is a trade-off to achieving zero-voltage switching. In particular, some energy is circulated back and forth between the primary and secondary windings of the transformer 12 in order to ring the voltages $V_{Q1}$ and $V_{Q2}$ across the FET's $Q_1$ and $Q_2$, respectively, to zero. This necessarily results in somewhat more current in the switches $Q_1$ and $Q_2$ than would otherwise be present in a conventional flyback circuit.

In accordance with the present invention, a simple circuit and method of operation are provided which achieves zero-voltage switching with reduced circulating current in the power switches, i.e., which does not require an active reversal of current in the secondary winding. Furthermore, only one power switching device and a diode are required, without additional resonant circuit elements.

Figure 3:
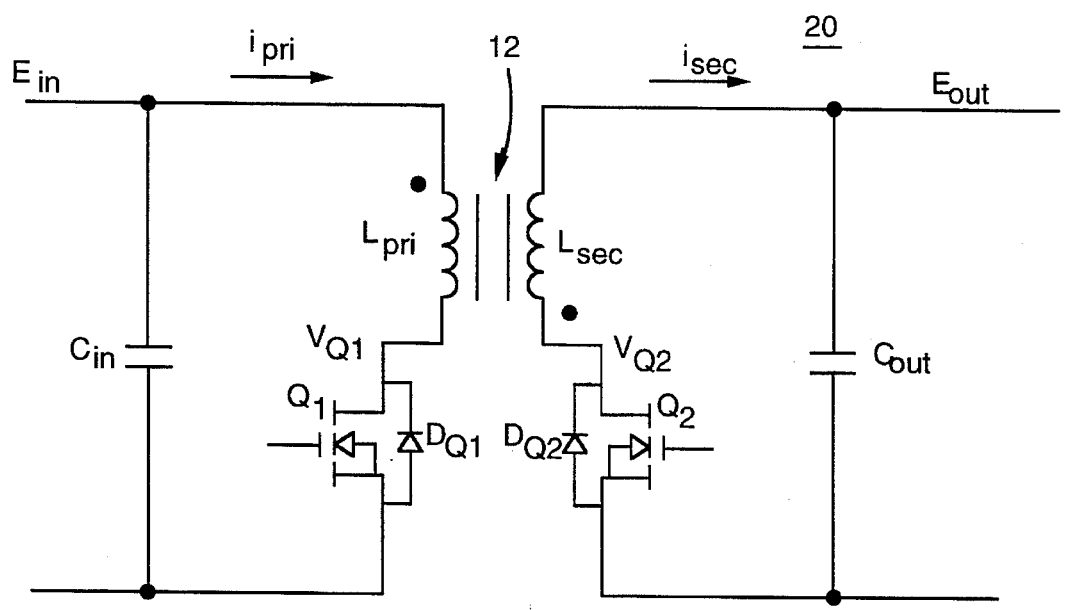
FIG. 3 schematically illustrates a high-frequency resonant flyback switching cell configured for natural zero-voltage switching according to the present invention.

FIG. 3 illustrates a high-frequency resonant flyback switching cell 20 suitable for controlling by "natural" zero-voltage switching in accordance with the present invention. In the circuit of FIG. 3, the parallel combination of a diode $D_2$ and a capacitance $C_2$ (which may comprise the parasitic capacitance of the diode $D_2$) replaces the secondary-side switching device $Q_2$ of FIG. 1.

Figure 4:
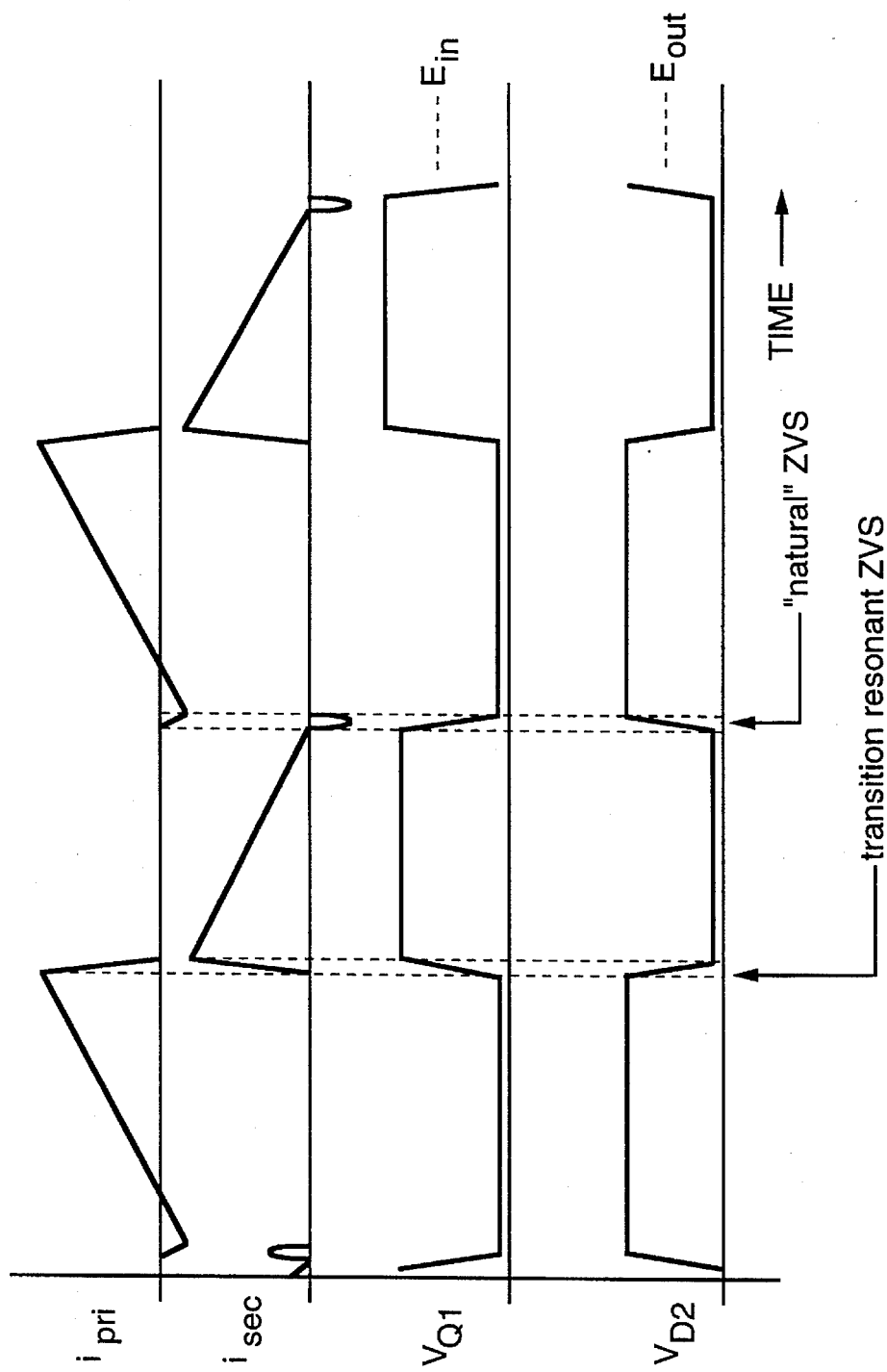
FIG. 4 graphically illustrates ideal current and voltage waveforms for the resonant flyback switching cell of FIG. 3 using natural zero-voltage switching in accordance with the present invention.

FIG. 4 graphically illustrates operation of the circuit of FIG. 3 in a "natural" zero-voltage switching mode according to the present invention. As energy is being released from the secondary winding $L_{sec}$, the current $i_{sec}$ in $L_{sec}$ (and $D_2$) falls toward zero. When the secondary current $i_{sec}$ reaches zero, diode $D_2$ is immediately off, and inductance $L_{sec}$ resonates with capacitance $C_2$ (being driven by the output voltage $E_{out}$), causing the voltage $V_{D2}$ to ring up toward twice the output voltage $E_{out}$. This voltage, transformed by the transformer, is just enough to ring the voltage $V_{Q1}$ on $Q_1$'s drain to zero. Hence, $Q_1$ is zero-voltage switched for the case where the converter is driven at or nearly at a 50% duty cycle.

As shown in FIG. 4, the secondary current $i_{sec}$ is approximately a half-sinusoidal pulse. The secondary voltage $V_{D2}$ rings up (approximately cosinusoidally), and the primary drain voltage rings down (approximately cosinusoidally), before $Q_1$ is switched on.

When operating in the "natural" zero-voltage switching mode according to the present invention, frequency may be varied to control output voltage, as described hereinabove, because the conduction time of the secondary is not constant, rather it is a function of the load current, i.e., the time for the secondary current $i_{sec}$ to discharge to zero.

To optimize operation at high frequencies, the transformer windings $L_{pri}$ and $L_{sec}$ should be tightly coupled. For example, a suitable transformer may be implemented in a high density interconnect (HDI) structure, such as, for example, of a type described in commonly assigned U.S. Pat. application Ser. No. 08/043,166 of W. A. Roshen, C. S. Korman and W. Daum, filed Apr. 1, 1993 and incorporated by reference herein. HDI technology is described generally in commonly assigned U.S. Pat. No. 4,783,695 of Eichelberger et al, also incorporated by reference herein.

Figure 5:
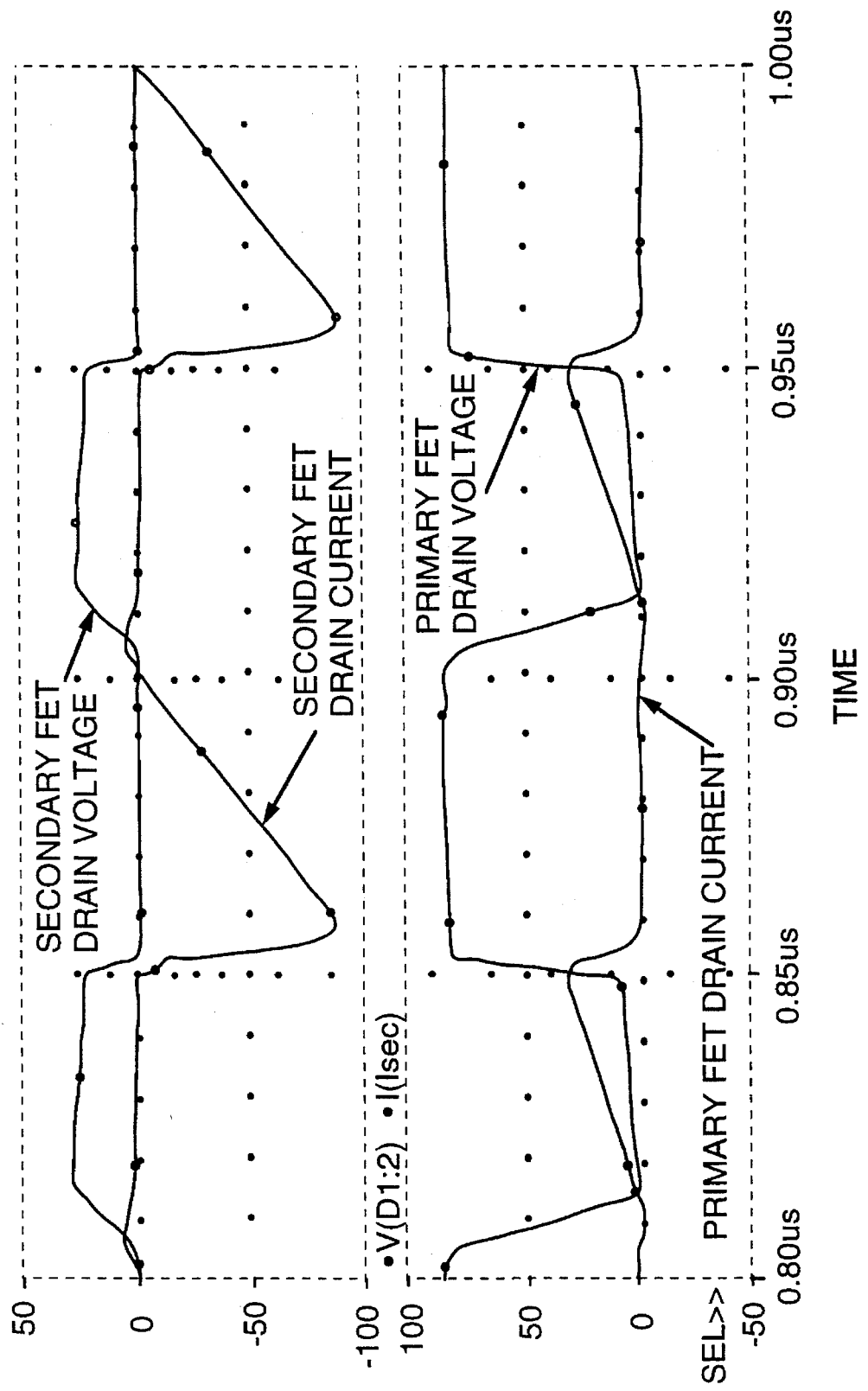
FIG. 5 graphically illustrates simulation results for a resonant flyback switching cell, such as that of FIG. 3, operating in the natural zero-voltage switching mode in accordance with the present invention.

FIG. 5 graphically illustrates simulation results for a resonant flyback switching cell, such as that of FIG. 1, constructed and operated in a "natural" zero-voltage switching mode according to the present invention for a 10MHz, 50 to 10 Vdc, 50 Watt converter.

The circuit of FIG. 1 with primary and secondary devices $Q_1$ and $Q_2$ can also be operated in the "natural" zero-voltage switching mode of the present invention by turning off device $Q_1$ when its drain current reaches zero, rather than leaving it on to store energy as shown in FIG. 2. As a result, the output capacitance of $Q_2$ will ring up toward twice the output voltage just as the output voltage of diode $D_2$ as shown in FIG. 4, allowing device $Q_1$ to operate in a zero-voltage switching mode. Thus, the circuit of FIG. 1 can operate in either the normal zero-voltage switching mode, as described hereinabove with reference to FIG. 2, or the "natural" zero-voltage switching mode according to the present invention, depending upon gating control of $Q_2$.

When operating in the natural zero-voltage switching mode, the control will increase frequency as the load lightens. At very light loads, frequency may be too high to obtain the desired performance. To avoid problems at very light loads, the switching device $Q_2$ with its parasitic diode $D_{Q2}$ (FIG. 1) may be used for operation in "dual" modes. That is, at or about a threshold frequency, the circuit of FIG. 1 may be operated in a zero-voltage switching mode, as described hereinabove with reference to FIGS. 1–2, and in a natural zero-voltage switching mode at frequencies below a threshold frequency, as described hereinabove with reference to FIGS. 3–5. To this end, at light loads (i.e., above the threshold frequency), $Q_2$ is left on to allow a sufficient reversal in current in $L_{sec}$ such that energy builds up in $L_{sec}$ to allow the voltage across $Q_1$ to resonate to zero, thus allowing for zero-voltage switching of $Q_1$. On the other hand, at heavier loads (i.e., below the threshold frequency), $Q_2$ remains off and operation in a natural zero-voltage switching mode proceeds via the parasitic diode $D_{Q2}$ in the manner described hereinabove. Advantageously, therefore, with this "dual" mode operation, $Q_2$ can be a lower-rated FET than $Q_1$ because $Q_2$ is only needed at light loads.

Other known types of switching cells can be modified to substitute a parallel combination of a diode $D_2$ and a capacitance $C_2$ (which may comprise the parasitic capacitance of the diode $D_2$) and operated in a "natural" zero-voltage switching mode according to the present invention.

Figure 6:
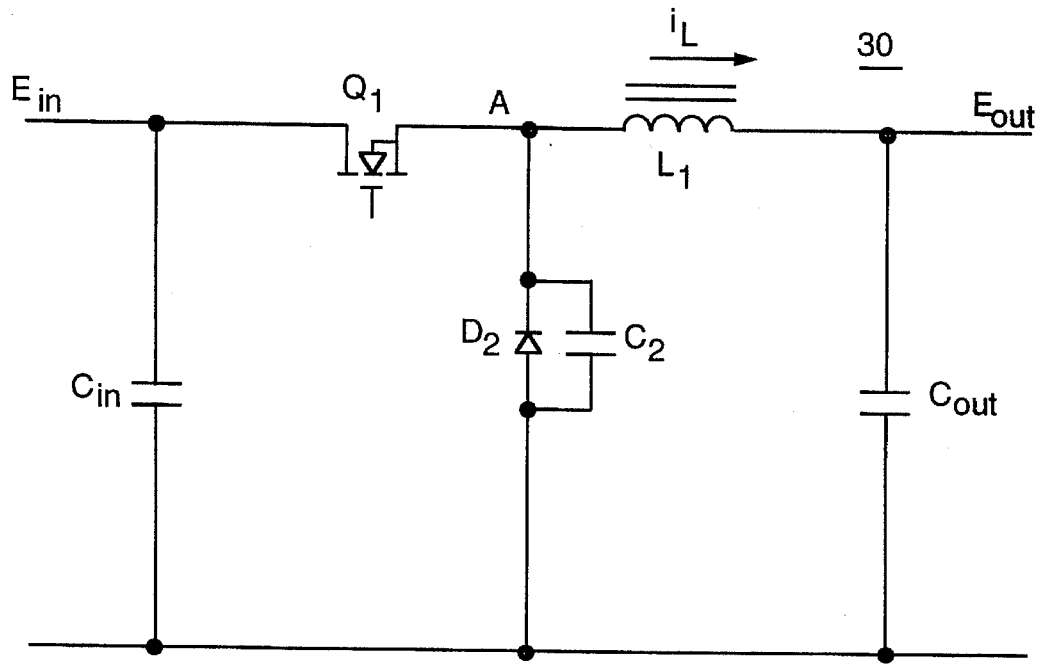
FIG. 6 schematically illustrates a high-frequency resonant buck switching cell configured for natural zero-voltage switching according to the present invention.
Figure 7:
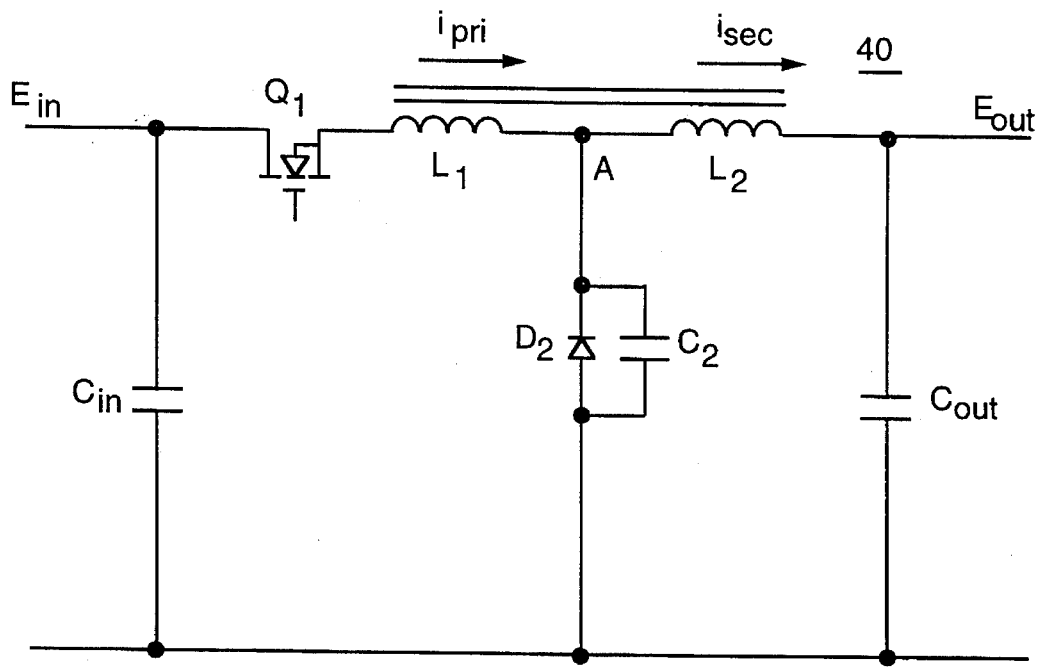
FIG. 7 schematically illustrates a high-frequency resonant buck switching cell with a tapped-transformer configured for natural zero-voltage switching according to the present invention.

For example, FIG. 6 illustrates a high-frequency resonant buck switching cell 30 configured according to the present invention to operate in a "natural" zero-voltage switching mode according to the present invention, with a magnetic component comprising an inductance $L_1$. (Current through $L_1$ is designated in FIG. 6 as $i_L$). The voltage at point A can ring up to a maximum of twice the output voltage $E_{out}$. Hence, such converters are operated to have an approximately 50% or greater duty cycle (i.e., the ratio of $E_{out}$ to $E_{in}$), which can be obtained by suitable selection of transformer turns ratios and/or taps. For converters having a greater than 50% step-down in voltage from $E_{in}$ to $E_{out}$, FIG. 7 illustrates a high-frequency resonant buck switching cell arrangement 40 with a tapped inductor $L_1/L_2$ (with a primary-side inductance $L_1$ and a secondary-side inductance $L_2$ determined by the tap). In the natural zero-voltage switching mode, when the current in the diode $D_2$ reaches zero, $L_2$ resonates with the capacitance $C_2$ to ring the voltage at point A toward twice the output voltage $E_{out}$. The inductor tap ensures that the voltage at point A is transformer-coupled so that the source of $Q_1$ is driven at least to the input voltage $E_{in}$, with the result that the voltage $V_{Q1}$ across $Q_1$ reduces to zero and zero-voltage switching occurs.

Figure 8:
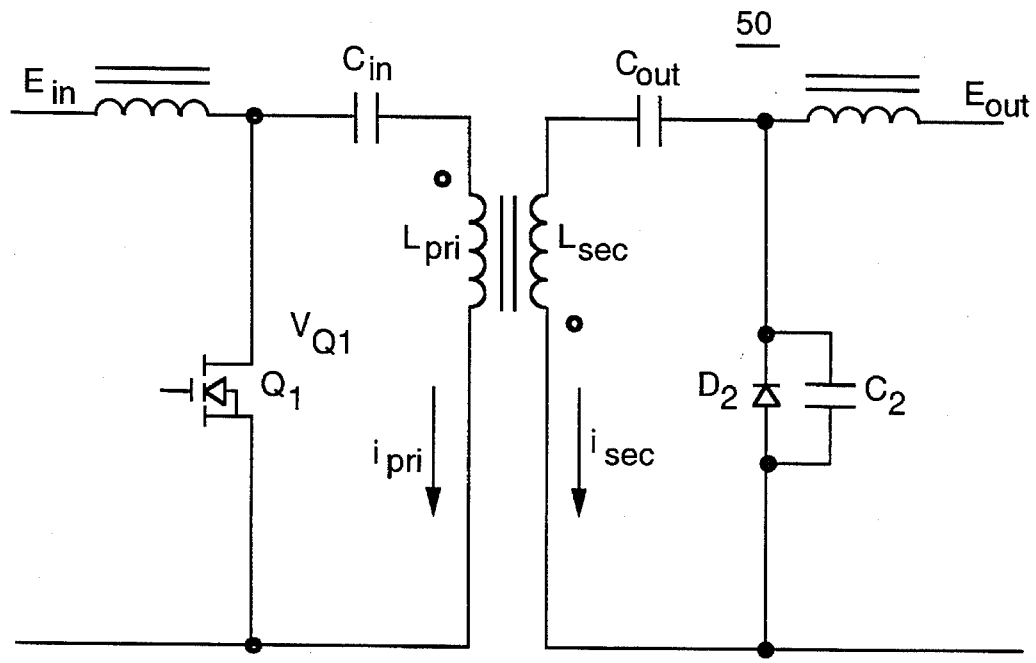
FIG. 8 schematically illustrates a high-frequency resonant Cuk switching cell configured for natural zero-voltage switching according to the present invention.

FIG. 8 illustrates a Cuk switching cell arrangement 50 with the secondary-side switching device replaced with the parallel combination of diode $D_2$ and capacitance $C_2$ and operated in a "natural" zero-voltage switching mode according to the present invention. In the converter of FIG. 8, energy is stored in the transformer winding inductance and, to zero-voltage switch $Q_1$, the switch capacitance rings with $L_{sec}$ which is driven by the dc voltage on $C_{out}$.

Figure 9:
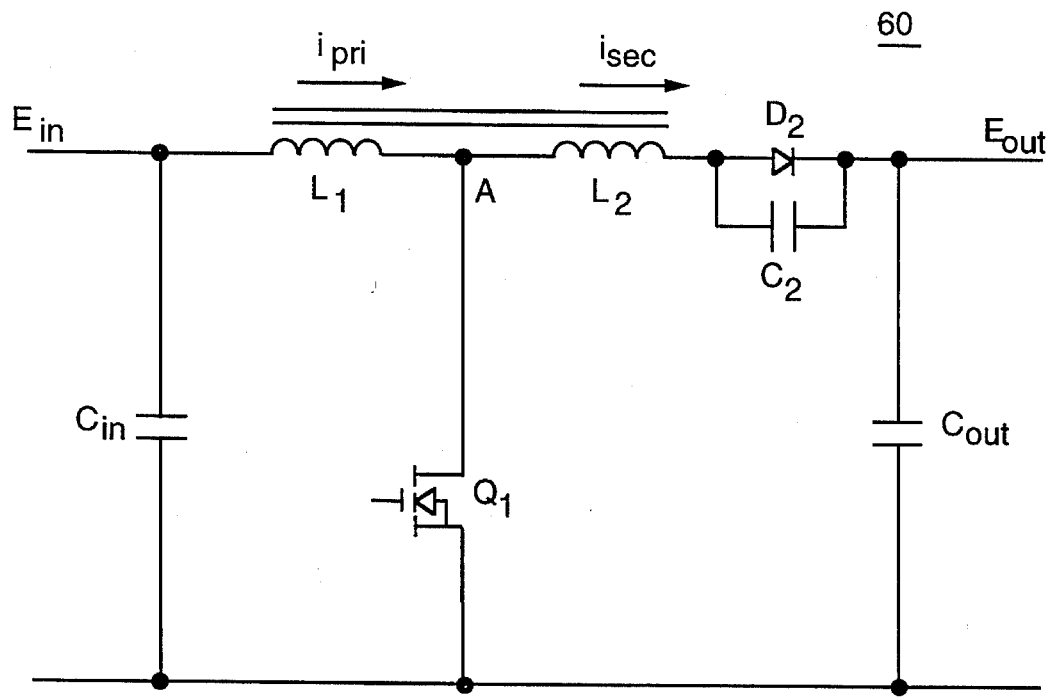
FIG. 9 schematically illustrates a high-frequency resonant boost switching cell configured for natural zero-voltage switching according to the present invention.

FIG. 9 illustrates a boost switching cell arrangement 60 with a tapped inductor $L_1/L_2$ and the secondary-side switching device replaced with the parallel combination of diode $D_2$ and capacitance $C_2$ and operated in a "natural" zero-voltage switching mode according to the present invention. In this case, when the current in diode $D_2$ goes to zero, the capacitance $C_2$ rings with the inductor $L_1/L_2$ being driven by the difference between the output and input voltages ($E_{out}$ $E_{in}$). By proper selection of the inductor tap, the voltage at point A (i.e., at the drain of $Q_1$) will ring to zero, allowing for zero-voltage switching.

Advantageously, the switching cells constructed and operated in a "natural" zero-voltage switching mode according to the present invention at high frequencies approaching, for example, 10MHz are highly efficient and may be implemented using very high density packaging techniques.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A dc-to-dc power converter, comprising:
   a transformer comprising a primary winding and a secondary winding, said transformer dividing the converter into a higher dc voltage primary side and a lower dc voltage secondary side;
   a single primary-side power switching device;
   a parallel combination of a diode and a capacitance situated on said secondary side; and
   control means for operating said power converter in a natural zero-voltage switching mode without actively reversing current in said secondary winding, thereby minimizing circulating currents in said switching device, such that the voltage across said power switching device resonates down to substantially zero as the current through said diode resonates substantially to zero whereupon said control means turns on said primary-side switching device with substantially zero-voltage thereacross.

2. The converter of claim 1 wherein said control means switches said primary-side switching device with an approximately 50% or greater duty cycle.

3. The converter of claim 1 wherein said transformer comprises a tapped inductor.

4. The converter of claim 1 wherein said transformer comprises an HDI structure.

5. The converter of claim 1, further comprising frequency control means for regulating the output voltage.

6. The converter of claim 1 wherein said parallel combination of said diode and said capacitance is implemented using another power switching device.

7. A dc-to-dc power converter, comprising:
   a transformer comprising a primary winding said and a secondary winding, said transformer dividing the converter into a higher dc voltage primary side and a lower dc voltage secondary side;
   a primary-side power switching device;
   a secondary-side power switching device having an integral parasitic diode; and
   control means for operating said power converter at frequencies below a threshold frequency in a natural zero-voltage switching mode without actively reversing current in said secondary winding, thereby minimizing circulating currents in said switching device, such that the voltage across said primary-side power switching device resonates down to substantially zero as the current through said parasitic diode resonates substantially to zero whereupon said control means switches said primary-side power switching device with substantially zero-voltage thereacross, said secondary-side power switching device remaining off at frequencies below said threshold frequency, said control means operating said power converter in a zero-voltage switching mode at frequencies above said threshold frequency such that the current is reversed in said secondary-side power switching device until there is sufficient energy storage such that said secondary-side power switching device is turned off to allow the voltage across said primary-side power switching device to resonate down to substantially zero whereupon said control means turn on said primary-side power switching device with substantially zero-voltage thereacross.

8. The converter of claim 7 wherein said control means switches said primary-side power switching device with an approximately 50% or greater duty cycle.

9. The converter of claim 7 wherein said transformer comprises a tapped inductor.

10. The converter of claim 7 wherein said transformer comprises an HDI structure.

11. The converter of claim 7, further comprising frequency control means for regulating the output voltage.

* * * * *